(12) United States Patent
Hines, III et al.

(10) Patent No.: US 8,060,056 B1
(45) Date of Patent: Nov. 15, 2011

(54) EMERGENCY CALL SERVICE TERMINATION

(75) Inventors: Thomas Edward Hines, III, Belton, MO (US); Hilah A. Rozier, Lenexa, KS (US); Sharon K. Walker, Village of Loch Lloyd, MO (US); Mark S. Freiermuth, Kansas City, MO (US); Victoria L. Zeller, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 846 days.

(21) Appl. No.: 11/566,477

(22) Filed: Dec. 4, 2006

(51) Int. Cl.
*H04M 11/04* (2006.01)

(52) U.S. Cl. ............ 455/404.1; 379/45; 379/37

(58) Field of Classification Search ........... 455/404.1; 379/37
See application file for complete search history.

(56) References Cited

U.S. PATENT DOCUMENTS

| | | | |
|---|---|---|---|
| 2005/0213716 A1* | 9/2005 | Zhu et al. | 379/45 |
| 2007/0135089 A1* | 6/2007 | Edge et al. | 455/404.1 |
| 2007/0201623 A1* | 8/2007 | Hines et al. | 379/37 |

* cited by examiner

*Primary Examiner* — Dwayne Bost
*Assistant Examiner* — Timothy Pham

(57) ABSTRACT

A communication network comprises a device configured to place a call for an emergency service, a call processing system in communication with the device and configured to receive and process the call to route the call to a public service answering point (PSAP), initiate a location determination process, and terminate the call, and a location provisioning system configured to execute the location determination process to determine the location of the device, wherein the location provisioning system comprises a plurality of sub systems, and wherein the call processing system communicates with only a first sub system of the plurality of sub systems to initiate the location determination process and communicates with the first sub system and a second sub system of the plurality of sub systems to terminate the call.

18 Claims, 6 Drawing Sheets

EMERGENCY CALL SERVICE TERMINATION

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to telecommunications, and in particular, to emergency call services, provisioning and termination.

2. Description of the Prior Art

Telecommunication service providers are increasingly required to provide location determination services for emergency service calls. For instance, when a wireless caller places a 911 call, the service provider carrying or otherwise handling the call must have the capabilities to determine the physical location of the caller. The public service answering point (PSAP) selected to handle the call can then use the location information to locate, find, and respond to the caller.

Often times, service providers provision their networks regionally. Typically, a single call processing center is assigned to a single region, such as a metropolitan region. Most regions include multiple PSAPs. In most cases, location determination systems exist to assist the call processing center with determining the geographical location of a caller.

A call processing center typically interfaces with location determination systems to initiate location processes and otherwise service emergency calls. An important facet of emergency call provisioning is the selection and distribution of a key that is utilized during a call to correlate information on the call by a wide variety of network elements. The key is typically selected from a finite pool of keys by the location determination system with which the call processing center interfaces. The key selection is then communicated by the call processing center to other elements, such as a PSAP, that need the key for information correlation purposes.

In many regions, the location determination system includes multiple sub-systems. Often times, the sub-systems are redundant. In these cases, the call processing center in a region may still communicate with only one of the sub-systems when provisioning an emergency call. The multiple sub-systems select keys from a shared pool of finite keys. Thus, when a call processing center communicates with one of the sub-systems on an emergency call, the one sub systems selects and reserves a key from the pool of keys. The other sub-system is prohibited from using the same key for any other calls that may be initiated to that other sub-system. An example of a sub-system is a mobile positioning center.

Problematically, when a call terminates, only one of the sub-systems is typically alerted of the termination. The one sub-system then releases the reserved key back to the pool of keys. However, the other sub-systems still holds the key in a reserved state. As a result, the other sub-system has one less key available for new calls. In times of high volume or congestion, such a situation can hinder emergency call processing and response.

FIG. 1 illustrates communication network 100 in an example of the prior art further describing the problems described above. Communication network 100 includes caller 101, communication network 110, call processing system (CPS) 121, public safety answering point (PSAP) 141, PSAP 151, and location provisioning system (LPS) 130. LPS 130 includes sub system 131 and sub system 132. Caller 101 is operatively coupled to communication network 110. CPS 121 is operatively coupled with communication network 110 and LPS 130, and in particular, with sub systems 131 and 132. PSAP 141 and PSAP 151 are also operatively coupled with communication network 110.

FIG. 2 illustrates an operational flow diagram describing the operation of communication network 100 in an example of the prior art. To begin, caller 101 places a 911 emergency services call to CPS 121. CPS 121 generally processes the call or call request to setup and connect the call to one of PSAP 141 or PSAP 151. CPS 121 selects either PSAP 141 or PSAP 151 based on the geographical location of caller 101. In the context of this example, it will be assumed that CPS 121 selects PSAP 141.

Sub system 131 and sub system 132 provide redundant location determination services for emergency calls placed to CPS 121. CPS 121 typically alternates communications between sub system 131 and sub system 132.

Upon receiving the call request, CPS 121 transmits a key request to sub system 131. The key request is typically part of a message sequence exchanged between CPS 121 and sub system 131 to determine the geographical location of caller 101.

Sub systems 131 and 132 store a pool of keys that are assigned to each 911 call initiated by CPS 121. The key is used by CPS 121 and other call elements, such as those elements within PSAP 141, to correlate call information for the emergency services call. After selecting the key, sub system 131 provides the key to CPS 131. The key is thereafter reserved or restricted by both sub system 131 and 132 from any use on any other calls.

CPS 121 responsively initiates call setup to PSAP 141, such as by transmitting call signaling. Included within the call setup process is a transfer of the key to PSAP 141. PSAP 141 queries sub system 131 with the key to obtain location information for caller 101. Sub system 131 initially responds with the location information. PSAP 141 continues a message dialogue with sub system 131 to maintain the location information.

Ultimately, a voice path is established between caller 101 and a termination point within PSAP 141, such as a phone, terminal, or computer of personnel within PSAP 141. The personnel can direct other personal, such as emergency service responders, to the location of caller 101.

Eventually, the call ends and caller 101 terminates the call, such as by hanging up, powering off, or otherwise ending the call. Caller 101 responsively transmits a termination message to CPS 121 alerting CPS 121 that the call has ended. CPS 121 forwards or generates and transmits a termination message to sub system 131. Sub system 131 responsively returns the reserved key to the pool of keys.

Unfortunately, a problem arises whereby sub system 131 is alerted of the call termination by CPS 121, but sub system 132 remains uninformed of the call termination. Thus, while sub system 131 returns the key to the key pool stored internally to sub system 131, sub system 132 maintains the key in a reserved or restricted state. As a result, the total number of keys available for emergency service calls is reduced. In times of high call volume, the pool of keys available to sub system 132 could become severely limited, if not exhausted entirely.

SUMMARY OF THE INVENTION

An embodiment of the invention helps solve the above problems and other problems by transmitting multiple termination messages to multiple sub systems so that a previously reserved key is completely released and available for future use. In an embodiment of the invention, a communication network comprises a device configured to place a call for an emergency service, a call processing system in communication with the device and configured to receive and process the call to route the call to a public service answering point (PSAP), initiate a location determination process, and terminate the call, and a location provisioning system configured to execute the location determination process to determine the location of the device, wherein the location provisioning system comprises a plurality of sub systems, and wherein the call processing system communicates with only a first sub system of the plurality of sub systems to initiate the location determination process and communicates with the first sub system and a second sub system of the plurality of sub systems to terminate the call.

In an embodiment, the call processing system transfers a key request to the first sub system to initiate the location determination process and wherein the first sub system returns a key to the call processing system in response to the key request and wherein the call processing system transfers the key to the PSAP.

In an embodiment, the PSAP queries the location provisioning system with the key to obtain the location of the device.

In an embodiment, the first sub system selects the key from a pool of keys.

In an embodiment, the first sub system the key from use on other calls.

In an embodiment, the second sub system reserves the key from use on the other calls.

In an embodiment, the call processing system transmits a first termination message to the first sub system to terminate the call.

In an embodiment, the first sub system releases the key for use on the other calls in response to the first termination message.

In an embodiment, the call processing system transmits a second termination message to the second sub system to terminate the call.

In an embodiment, the second sub system releases the key for use on the other calls in response to the second termination message.

In an embodiment, a method of operating communication network comprises, in a device, placing a call for an emergency service, in a call processing system in communication with the device, receiving and processing the call to route the call to a public service answering point (PSAP), initiating a location determination process, and terminating the call, in a location provisioning system, executing the location determination process to determine the location of the device wherein the location provisioning system comprises a plurality of sub systems, and in the call processing system, communicating with only a first sub system of the plurality of sub systems to initiate the location determination process and communicating with the first sub system and a second sub system of the plurality of sub systems to terminate the call.

BRIEF DESCRIPTION OF THE DRAWINGS

The same reference number represents the same element on all drawings.

DETAILED DESCRIPTION OF THE PREFERRED EMBODIMENT

FIGS. 3-6 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
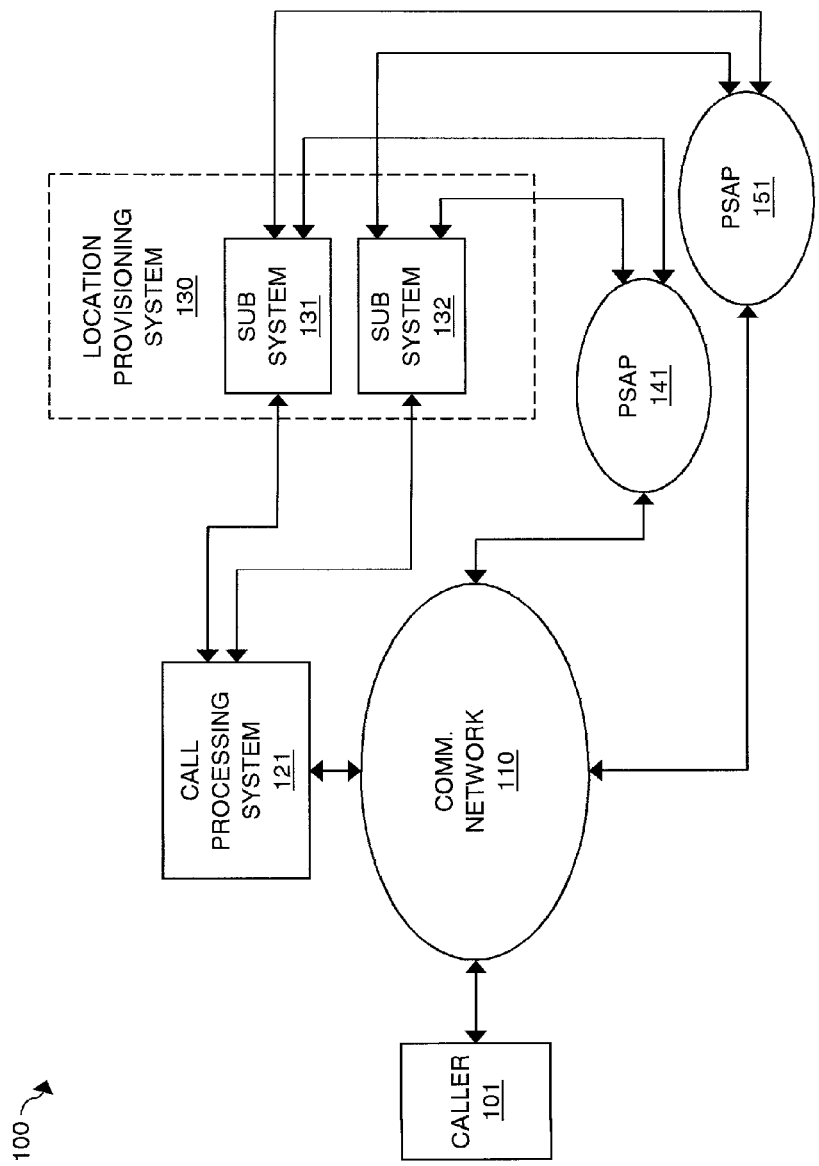
FIG. 1 illustrates a communication network in an example of the prior art.
Figure 2:
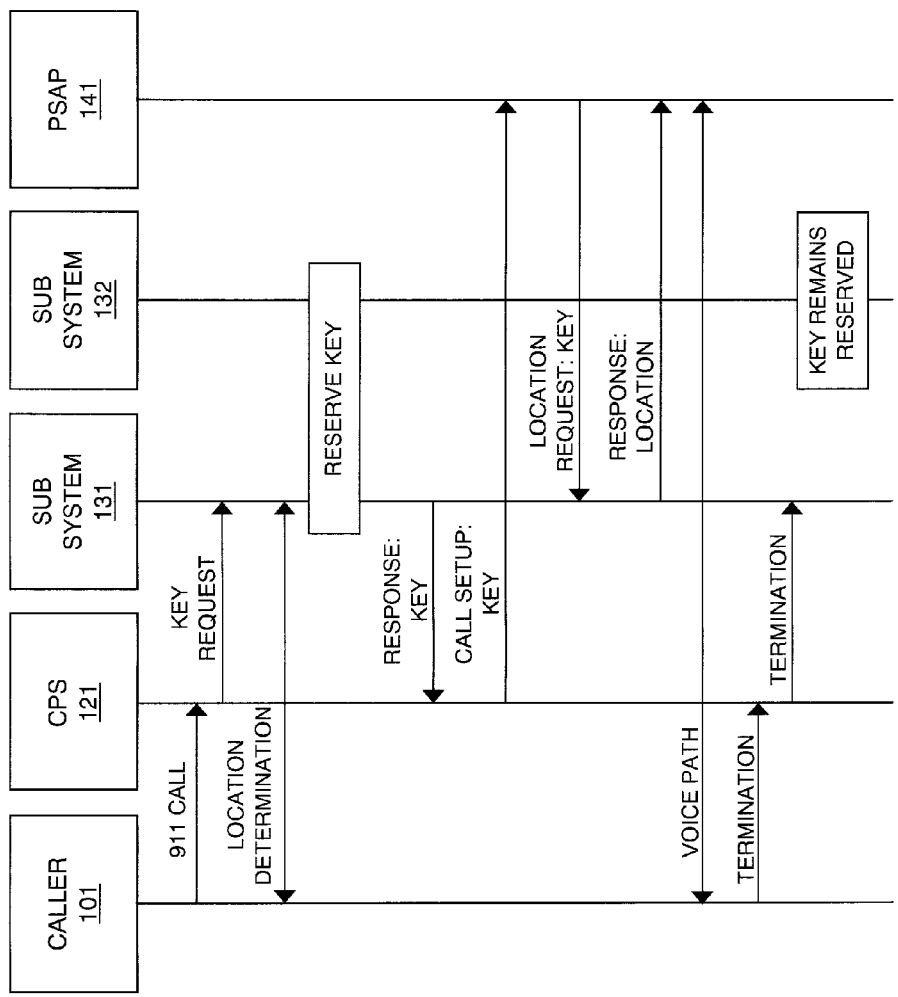
FIG. 2 is a flow diagram in an example of the prior art.
Figure 3:
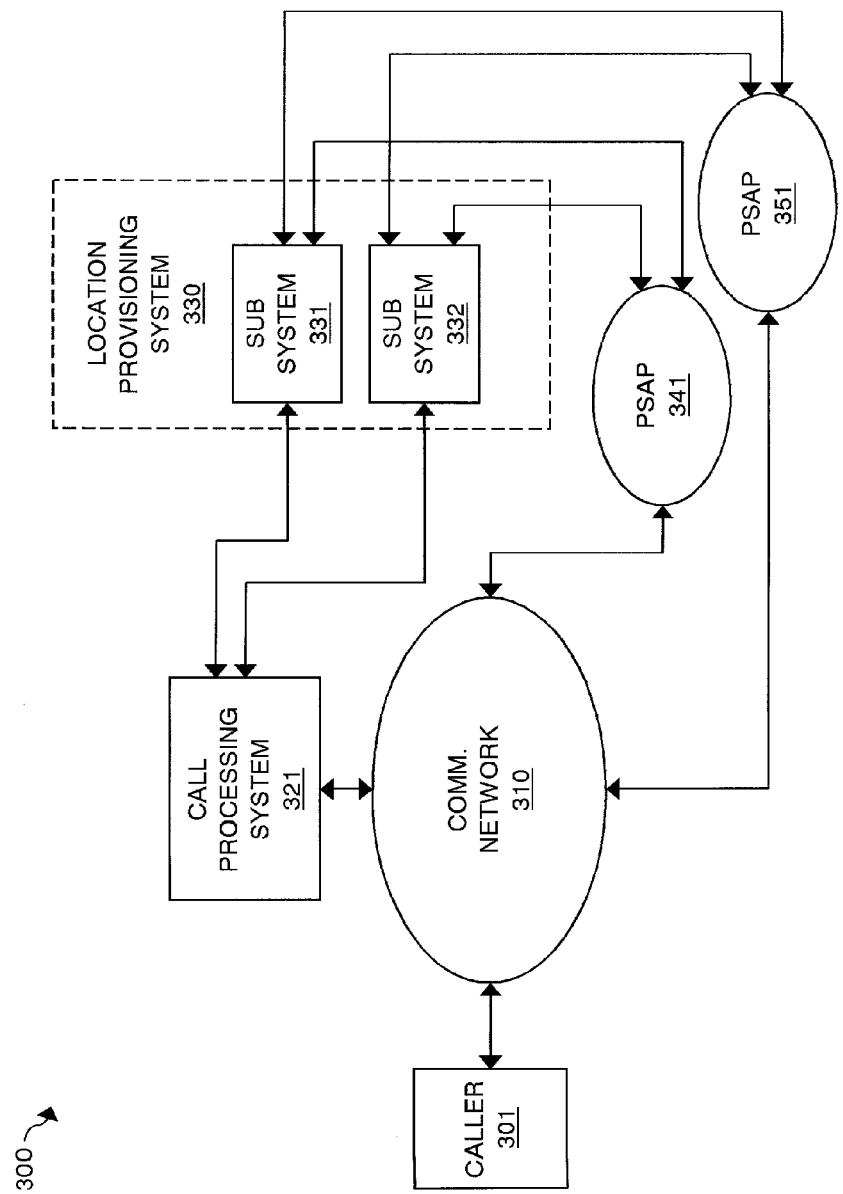
FIG. 3 illustrates a communication network in an embodiment of the invention.

FIG. 3 illustrates communication network 300 in an embodiment of the invention. Communication network 300 includes caller 301, communication network 310, call processing system (CPS) 321, public safety answering point (PSAP) 341, PSAP 351, and location provisioning system (LPS) 330. LPS 330 includes sub system 331 and sub system 332. Caller 301 is operatively coupled to communication network 310. CPS 321 is operatively coupled with communication network 310 and LPS 330, and in particular, with sub systems 331 and 332. PSAP 341 and PSAP 351 are also operatively coupled with communication network 310.

Communication network 310 could be any network or collection of networks that couple, link, or otherwise operatively connect caller 301 with CPS 321, caller 301 with either PSAP 341 or PSAP 351, and CPS 321 with either PSAP 341 or PSAP 351. It should be understood that communication network 310 could also connect CPS 321 with LPS 330, or PSAP 341 and PSAP 351 with LPS 330. However, other secondary data networks could be used. In an example, communication network could include a backhaul network, a local network, a long distance network, or a packet network, or any combination thereof, as well as other types of networks.

Caller 301 could be any device, system, or other such communication platform capable of communicating with CPS 321 and PSAP 341 or PSAP 351 over communication network 310. Caller 301 could be, for example, a mobile phone, a wireless phone, or a wireline phone, or any combination thereof, as well as any other type of device or system. Other types of communication platforms are possible.

CPS 321 could be any system or collection of systems capable of communicating with caller 301 and PSAP 341 or 351 to setup, tear-down, and otherwise handle an emergency service call. CPS 321 could also be capable of communicating with sub systems 331 and 332 to initiate location determination processes to determine the location of emergency service calls. CPS 321 could be, for example, a mobile switching center (MSC), a soft switch, a media gateway controller, or any combination or variation thereof, as well another type of call processing system.

Location provisioning system 330 could be any system or collection of systems, such as sub systems 331 and 332, capable of determining the location of callers to emergency services. In an example, sub systems 331 and 332 could be mobile positioning centers (MPC). It should be understood that location provisioning system 330 could include additional elements not pictured for the sake of clarity. For example, position determining equipment (PDE) could be included. Furthermore, a gateway system could be included to interface between PSAPs 341 and 351 and sub systems 31 and 332. An example of a gateway is an automatic location identification (ALI) gateway or database.

Figure 4:
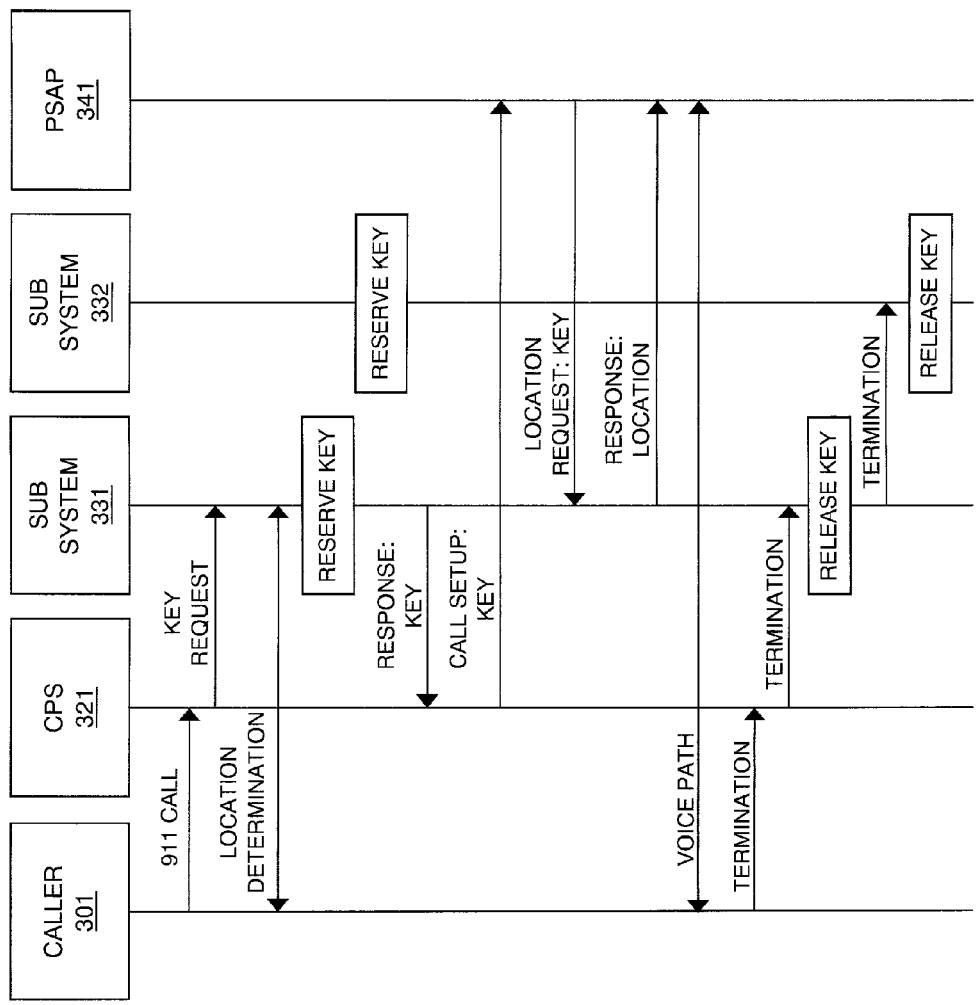
FIG. 4 illustrates a flow diagram in an embodiment of the invention.

FIG. 4 illustrates an operational flow diagram describing the operation of communication network 300 in an example of the invention. To begin, caller 301 places a 911 emergency services call to CPS 321. CPS 321 generally processes the call or call request to setup and connect the call to one of PSAP 341 or PSAP 351. CPS 321 selects either PSAP 341 or PSAP 351 based on the geographical location of caller 301. In the context of this example, it will be assumed that CPS 321 selects PSAP 341.

Sub system 331 and sub system 332 provide redundant location determination services for emergency calls placed to CPS 321. CPS 321 typically alternates communications between sub system 331 and sub system 332.

Upon receiving the call request, CPS 321 transmits a key request to sub system 331. The key request is typically part of a message sequence exchanged between CPS 321 and sub system 331 to determine the geographical location of caller 301.

Sub systems 331 and 332 store a pool of keys that are assigned to each 911 call initiated by CPS 121. The key is used by CPS 321 and other call elements, such as those elements within PSAP 341, to correlate call information for the emergency services call. After selecting the key, sub system 331 provides the key to CPS 331. The key is thereafter reserved or restricted by both sub system 331 and 332 from any use on any other calls.

CPS 321 responsively initiates call setup to PSAP 341, such as by transmitting call signaling. Included within the call setup process is a transfer of the key to PSAP 341. PSAP 341 queries sub system 331 with the key to obtain location information for caller 301. Sub system 331 initially responds with the location information. PSAP 341 continues a message dialogue with sub system 331 to maintain the location information.

Ultimately, a voice path is established between caller 301 and a termination point within PSAP 341, such as a phone, terminal, or computer of personnel within PSAP 341. The personnel can direct other personal, such as emergency service responders, to the location of caller 301.

Eventually, the call ends and caller 301 terminates the call, such as by hanging up, powering off, or otherwise ending the call. Caller 301 responsively transmits a termination message to CPS 321 alerting CPS 321 that the call has ended. CPS 321 forwards or generates and transmits a termination message to sub system 331. Sub system 31 responsively returns the reserved key to the pool of keys. Sub system 331 also responsively transmits a termination message to sub system 332. Sub system 332 then also responsively returns the reserved key to the pool of keys. Advantageously, the previously reserved key is now available to both sub systems 331 and 332 for further use with new calls.

Figure 5:
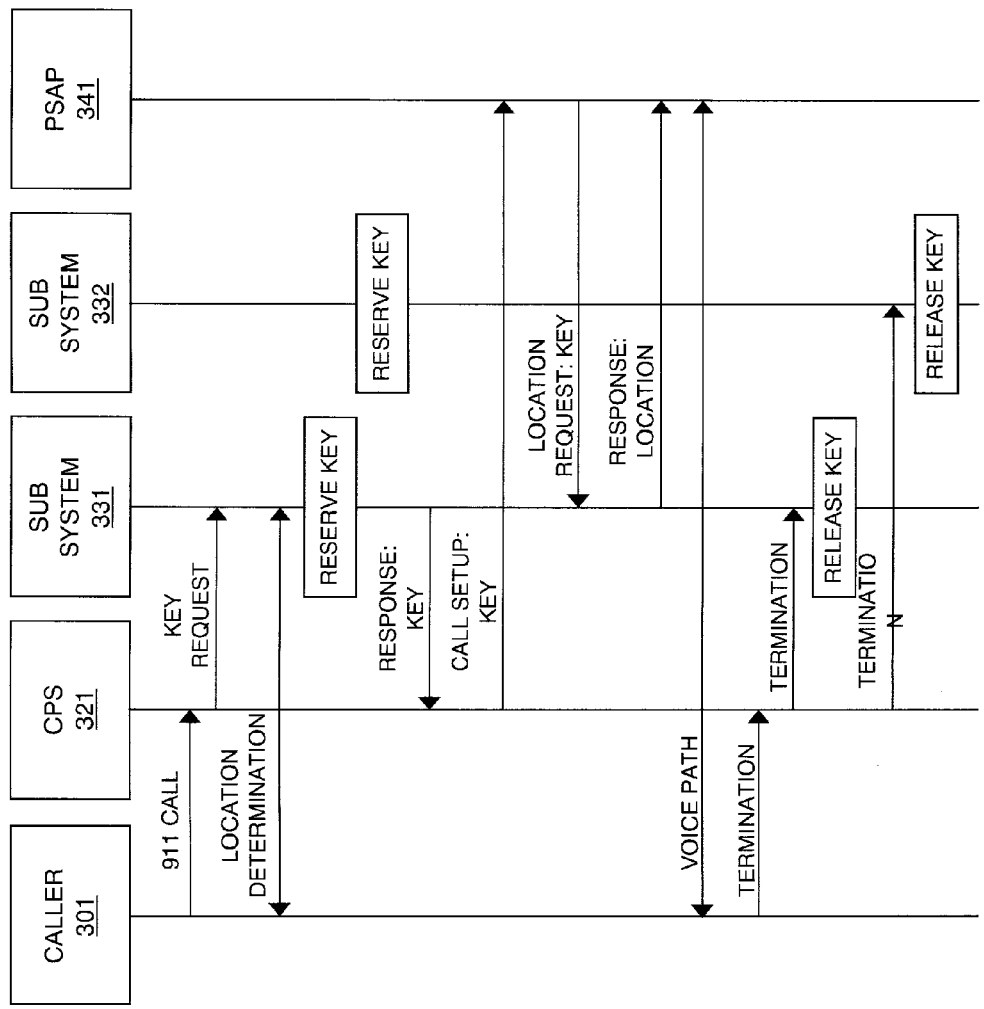
FIG. 5 illustrates a flow diagram in an embodiment of the invention.

FIG. 5 illustrates an operational flow diagram describing the operation of communication network 300 in an example of the invention. To begin, caller 301 places a 911 emergency services call to CPS 321. CPS 321 generally processes the call or call request to setup and connect the call to one of PSAP 341 or PSAP 351. CPS 321 selects either PSAP 341 or PSAP 351 based on the geographical location of caller 301. In the context of this example, it will be assumed that CPS 321 selects PSAP 341.

Sub system 331 and sub system 332 provide redundant location determination services for emergency calls placed to CPS 321. CPS 321 typically alternates communications between sub system 331 and sub system 332.

Upon receiving the call request, CPS 321 transmits a key request to sub system 331. The key request is typically part of a message sequence exchanged between CPS 321 and sub system 331 to determine the geographical location of caller 301.

Sub systems 331 and 332 store a pool of keys that are assigned to each 911 call initiated by CPS 121. The key is used by CPS 321 and other call elements, such as those elements within PSAP 341, to correlate call information for the emergency services call. After selecting the key, sub system 331 provides the key to CPS 331. The key is thereafter reserved or restricted by both sub system 331 and 332 from any use on any other calls.

CPS 321 responsively initiates call setup to PSAP 341, such as by transmitting call signaling. Included within the call setup process is a transfer of the key to PSAP 341. PSAP 341 queries sub system 331 with the key to obtain location information for caller 301. Sub system 331 initially responds with the location information. PSAP 341 continues a message dialogue with sub system 331 to maintain the location information.

Ultimately, a voice path is established between caller 301 and a termination point within PSAP 341, such as a phone, terminal, or computer of personnel within PSAP 341. The personnel can direct other personal, such as emergency service responders, to the location of caller 301.

Eventually, the call ends and caller 301 terminates the call, such as by hanging up, powering off, or otherwise ending the call. Caller 301 responsively transmits a termination message to CPS 321 alerting CPS 321 that the call has ended. CPS 321 forwards or generates and transmits a termination message to sub system 331. Sub system 31 responsively returns the reserved key to the pool of keys. CPS 321 also forwards or generates and transmits a termination message to sub system 332. Sub system 332 then also responsively returns the reserved key to the pool of keys. Advantageously, the previously reserved key is now available to both sub systems 331 and 332 for further use with new calls.

Figure 6:
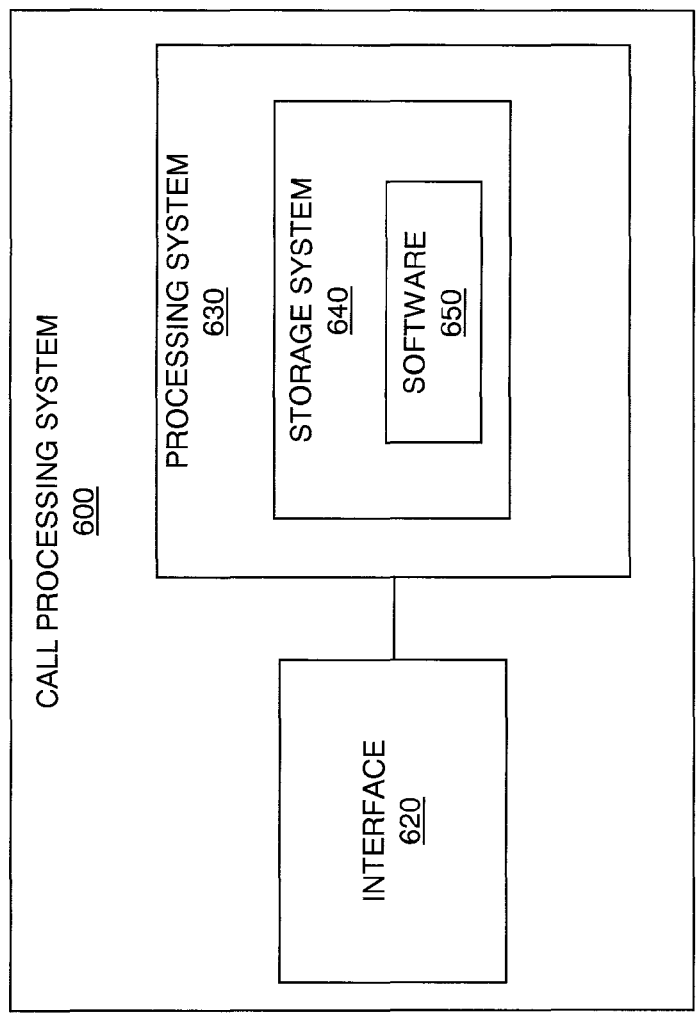
FIG. 6 illustrates a call processing system in an embodiment of the invention.

FIG. 6 illustrates call processing system 600 in an embodiment of the invention. Call processing system 600 includes interface 620, processing system 630, storage system 640, and software 650. Storage system 640 stores software 650. Processing system 630 is linked to interface 620. Call processing system 600 could be comprised of a programmed general-purpose computer, although those skilled in the art will appreciate that programmable or special purpose circuitry and equipment may be used. Call processing system 600 may use a client server architecture where operations are distributed among a server system and client devices that together comprise elements 620-650.

Interface 620 could comprise a network interface card, modem, port, or some other communication device. Signaling interface 620 may be distributed among multiple communication devices. Interface 630 could comprise a computer microprocessor, logic circuit, or some other processing device. Processing system 630 may be distributed among multiple processing devices. Storage system 640 could comprise a disk, tape, integrated circuit, server, or some other memory device. Storage system 640 may be distributed among multiple memory devices.

Processing system 630 retrieves and executes software 650 from storage system 640. Software 650 may comprise an operating system, utilities, drivers, networking software, and other software typically loaded onto a general-purpose computer. Software 650 could also comprise an application program, firmware, or some other form of machine-readable processing instructions. When executed by the processing system 630, software 650 directs processing system 630 to operate as described above for call processing system 231.

What is claimed is:

1. A communication network comprising:
    a device configured to place a call for an emergency service;
    a call processing system in communication with the device and configured to receive and process the call to route the call to a public service answering point (PSAP), initiate a location determination process, and terminate the call;
    a location provisioning system configured to execute the location determination process to determine a location of the device and provide an emergency service key for the call to the call processing system and the PSAP, wherein the location provisioning system comprises a plurality of redundant sub systems configured to determine the location of the device and share a pool of keys;
    a first sub system of the plurality of redundant sub systems configured to select a first key from the shared pool of keys to provide as the emergency service key, wherein the selection of the first key from the shared pool of keys restricts the first key from the shared pool of keys for subsequent use by the first sub system and a second sub system of the plurality of redundant sub systems;
    the call processing system configured to communicate with only the first sub system of the plurality of redundant sub systems to initiate the location determination process and communicate with the first sub system and the second sub system of the plurality of redundant sub systems to terminate the call; and
    in response to the communication from the call processing system to terminate the call, the first sub system and the second sub system are configured to release the first key back into the shared pool of keys for subsequent use.

2. The communication network of claim 1 wherein the call processing system transfers a key request to the first sub system to initiate the location determination process and wherein the first sub system returns the first key to the call processing system in response to the key request and wherein the call processing system transfers the emergency service key to the PSAP.

3. The communication network of claim 2 wherein the PSAP queries the location provisioning system with the emergency service key to obtain the location of the device.

4. The communication network of claim 3 wherein the first sub system reserves the first key from use on other calls.

5. The communication network of claim 4 wherein the second sub system reserves the first key from use on the other calls.

6. The communication network of claim 5 wherein the call processing system transmits a first termination message to the first sub system to terminate the call.

7. The communication network of claim 6 wherein the first sub system releases the first key for use on the other calls in response to the first termination message.

8. The communication network of claim 7 wherein the call processing system transmits a second termination message to the second sub system to terminate the call.

9. The communication network of claim 8 wherein the second sub system releases the first key for use on the other calls in response to the second termination message.

10. A method of operating communication network, the method comprising:
    in a device, placing a call for an emergency service;
    in a call processing system in communication with the device, receiving and processing the call to route the call to a public service answering point (PSAP), initiating a location determination process, and terminating the call;
    in a location provisioning system, executing the location determination process to determine the location of the device and provide an emergency service key for the call to the call processing system and the PSAP, wherein the location provisioning system comprises a plurality of redundant sub systems configured to determine the location of the device, and wherein a first sub system and a second subsystem of the plurality of redundant sub systems share a pool of keys;
    in the first sub system of the plurality of redundant sub systems, selecting a first key from the shared pool of keys to provide as the emergency service key, wherein selecting the first key from the shared pool of keys restricts the first key from the shared pool of keys for subsequent use by the first sub system and the second sub system of the plurality of redundant sub systems;
    in the call processing system, communicating with only the first sub system of the plurality of redundant sub systems to initiate the location determination process and communicating with the first sub system and the second sub system of the plurality of redundant sub systems to terminate the call; and
    in the first sub system and the second sub system, releasing the first key back into the shared pool of keys for subsequent use in response to the communication from the call processing system to terminate the call.

11. The method of claim 10 further comprising, in the call processing system, transferring a key request to the first sub system to initiate the location determination process, receiving from the first sub system the first key in response to the key request and transferring the emergency service key to the PSAP.

12. The method of claim 11 further comprising the PSAP querying the location provisioning system with the emergency service key to obtain the location of the device.

13. The method of claim 12 further comprising the first sub system reserving the first key from use on other calls.

14. The method of claim 13 further comprising the second sub system reserving the first key from use on the other calls.

15. The method of claim 14 further comprising the call processing system transmitting a first termination message to the first sub system to terminate the call.

16. The method of claim 15 further comprising the first sub system releasing the first key for use on the other calls in response to the first termination message.

17. The method of claim 16 further comprising the call processing system transmitting a second termination message to the second sub system to terminate the call.

18. The method of claim 17 further comprising the second sub system releasing the first key for use on the other calls in response to the second termination message.

* * * * *